United States Patent [19]

Yamagishi

[11] Patent Number: 4,591,243

[45] Date of Patent: May 27, 1986

[54] MICROSCOPE OBJECTIVE

[75] Inventor: Masaaki Yamagishi, Tokyo, Japan

[73] Assignee: Olympus Optical Co., Ltd., Tokyo, Japan

[21] Appl. No.: 694,632

[22] Filed: Jan. 24, 1985

[30] Foreign Application Priority Data

Jan. 30, 1984 [JP] Japan .................................. 59-13512

[51] Int. Cl.⁴ .......................... G02B 9/62; G02B 21/02
[52] U.S. Cl. ..................................... 350/414; 350/464
[58] Field of Search ................................. 350/414, 464

[56] References Cited

U.S. PATENT DOCUMENTS

| 3,806,231 | 4/1974 | Taira ................................... 350/414 |
| 4,403,835 | 9/1983 | Ushida .................................. 350/414 |
| 4,521,083 | 6/1985 | Togino .................................. 350/414 |

FOREIGN PATENT DOCUMENTS

47-33646 11/1972 Japan .

Primary Examiner—John K. Corbin
Assistant Examiner—Scott J. Sugarman
Attorney, Agent, or Firm—Cushman, Darby & Cushman

[57] ABSTRACT

A microscope objective comprising a first lens component arranged as a positive meniscus lens, a second lens component arranged as a positive lens, a third lens component having positive refractive power, a fourth lens component having positive refractive power, a fifth lens component having negative refractive power, and a sixth lens component arranged as a cemented positive meniscus lens, the microscope objective being arranged that the working distance is extremely long, aberrations are corrected extremely favorably up to the marginal portion of field, and magnification is 40×.

8 Claims, 9 Drawing Figures

MICROSCOPE OBJECTIVE

BACKGROUND OF THE INVENTION (a) Field of the Invention

The present invention relates to a microscope objective and, more particularly, to a microscope objective with a magnification about 40× of which the working distance is long and aberrations are favourably corrected up to the marginal portion of field.

(b) Description of the Prior Art

Known microscope objectives with a magnification about 40×, long working distance and aberrations favourably corrected up to the marginal portion of the field are disclosed, for example, in Japanese published unexamined patent application No. 33646/72 etc. However, the working distance of those known microscope objectives is about 70% of the focal length, and this is insufficient when using the microscope objectives in such manner as to give some operation to the specimen by observing it through a microscope. Besides, even when using the microscope objectives in other manners, a working distance longer than the above is more preferable because it is then convenient for use.

On the other hand, microscope objectives have such tendency that aberrations abruptly become unfavourable when it is attempted to make the working distance long by keeping the same degree of NA and, consequently, it becomes difficult to obtain a favourable quality of image. Therefore, in known microscope objectives, a meniscus lens having a concave surface with strong curvature on the image side is arranged in the rear lens group in order to make the working distance long. However, even when the above-mentioned arrangement is made, aberrations abruptly become unfavourable when the working distance is made longer than a certain degree, and it becomes difficult to correct them.

Due to the above-mentioned reason, there is no known microscope objective of which the working distance is very long and, at the same time, aberrations are favourably corrected up to the marginal portion of field.

SUMMARY OF THE INVENTION

It is, therefore, a primary object of the present invention to provide a microscope objective with a magnification about 40× of which the working distance is extremely long, image surface is flat and aberrations are favourably corrected up to the marginal portion of field.

The microscope objective according to the present invention comprises a first lens component arranged as a positive meniscus lens having a concave surface on the object side, a second lens component arranged as a positive lens, a third lens component comprising a positive lens element and having positive refractive power as a whole, a fourth lens component comprising a positive lens element and having positive refractive power as a whole, a fifth lens component comprising a negative lens element and having negative refractive power as a whole, and a sixth lens component arranged as a cemented positive meniscus lens, the microscope objective according to the present invention fulfilling the conditions (1) through (4) shown below:

$$1.8f < |f_{VVI}| < 2.6f, \quad f_{VVI} < 0 \quad (1)$$

$$1.2 < r_1/r_2 < 1.8 \quad (2)$$

$$2 < |r_3/r_4| < 3.7, \quad r_3/r_4 < 0 \quad (3)$$

$$\nu_{IIp}, \nu_{IIIp-1} > 65 \quad (4)$$

where, reference symbol f represents the focal length of the lens system as a whole, reference symbol $f_{VVI}$ represents the total focal length of the fifth and sixth lens components, reference symbols $r_1$ and $r_2$ respectively represent radii of curvature of the surface on the object side and surface on the image side of the first lens component, reference symbols $r_3$ and $r_4$ respectively represent radii of curvature of the surface on the object side and surface on the image side of the second lens component, reference symbol $\nu_{IIp}$ represents Abbe's number of the positive lens constituting the second lens component, and reference symbol $\nu_{IIIp-1}$ represents Abbe's number of the first positive lens element counted from the object side in the third lens component.

By adopting the above-mentioned lens configuration and arranging to fulfill the respective conditions shown in the above, the present invention enables to obtain a microscope objective with an extremely long working distance and aberrations corrected favourably up to the marginal portion of field which is the primary object of the present invention.

The condition (1) is established in order to materialize a microscope objective having an extremely long working distance which is an object of the present invention. That is, by selecting the total focal length $f_{VVI}$ of the fifth and sixth lens components constituting the rear lens group as a negative value within a certain range as shown by the condition (1), it is arranged to obtain a microscope objective with an extremely long working distance which is an object of the present invention.

If $|f_{VVI}|$ becomes larger than the upper limit of the condition (1), the negative refractive power of the fifth and sixth lens components as a whole becomes weak, and it is impossible to ensure a satisfactorily long working distance. If $|f_{VVI}|$ becomes smaller than the lower limit of the condition (1), the negative refractive power of the fifth and sixth lens components as a whole becomes too strong. As a result, Petzval's sum and spherical aberrations are overcorrected and, when it is attempted to correct them by other lens components, it becomes difficult to correct offaxial aberrations such as coma etc.

The conditions (2) and (3) are established in order to minimize spherical aberration to be caused by the front lens group comprising the first, second, third and fourth lens components. If the condition (2) and/or (3) are not fulfilled, the correction coefficients of surfaces $r_1$, $r_2$, $r_3$ and $r_4$ for spherical aberration do not become uniform, and the correction coefficient of some of said surfaces becomes large. As a result, spherical aberration caused by the surface becomes remarkably large, and it becomes impossible to correct spherical aberration by the rear lens group.

The condition (4) is established in order to make longitudinal chromatic aberration small and, especially, to make the secondary spectrum small. If the condition (4) is not fulfilled, the secondary spectrum becomes large.

Besides the conditions described so far, it is preferable to arrange that the microscope objective according to the present invention further fulfills the conditions (5) and (6) shown below:

$$3.5f < |r_{12}/(n_{V-1} - 1)| < 5.2f \quad (5)$$
$$r_{12}/(n_{V-1} - 1) < 0$$

$$1.5f < |r_{17}/(1 - n_{VI-2})| < 2f \quad (6)$$
$$r_{17}/(1 - n_{VI-2}) < 0$$

where, reference symbol $r_{12}$ represents the radius of curvature of the surface on the object side of the fifth lens component, reference symbol $r_{17}$ represents the radius of curvature of the surface on the image side of the sixth lens component, reference symbol $n_{V-1}$ represents the refractive index of the first negative lens element counted from the object side in the fifth lens component, and reference symbol $n_{VI-2}$ represents the refractive index of the second negative lens element counted from the object side in the sixth lens component.

The conditions (5) and (6) are established in order to make spherical aberration, which is minimized by fulfilling the conditions (2) and (3) still smaller, and to correct offaxial aberrations at the same time.

The condition (5) is established in order to chiefly correct spherical aberration and relates to the surface $r_{12}$. If the value defined by the condition (5) becomes larger than the upper limit thereof, spherical aberration will be undercorrected. If it is attempted to correct said spherical aberration by means of other lens surfaces, offaxial aberrations become unfavourable and it is difficult to correct them. If the value defined by the condition (5) becomes smaller than the lower limit thereof, Petzval's sum becomes a negative value with a large absolute value, and curvature of field will be overcorrected.

The condition (6) is established in order to chiefly correct offaxial aberrations and, especially, to correct coma. If the value defined by the condition (6) becomes larger than the upper limit thereof or smaller than the lower limit thereof, it becomes difficult to favourably correct coma, which is caused by the first through the fourth lens components, without disturbing the symmetry of coma and, at the same time, by keeping favourable balance with spherical aberration.

When paraxial aberrations and offaxial aberrations are corrected by fulfilling the conditions (5) and (6) shown in the above, spherical aberration of the secondary spectrum will be largely overcorrected. To correct said spherical aberration of the secondary spectrum, it is preferable to arrange that the microscope objective according to the present invention further fulfills the conditions (7) through (10) shown below:

$$f < r_{13} < 2f \quad (7)$$

$$\nu_{Vp} - \nu_{Vn} > 40 \quad (8)$$

$$f < |r_{16}| < 2f, \; r_{16} < 0 \quad (9)$$

$$\nu_{VIn} - \nu_{VIp} > 20 \quad (10)$$

where, reference symbol $r_{13}$ represents the radius of curvature of the cemented surface of the fifth lens component, reference symbol $r_{16}$ represents the radius of curvature of the cemented surface of the sixth lens component, reference symbols $\nu_{Vp}$ and $\nu_{Vn}$ respectively represent Abbe's numbers of the positive and negative lens elements constituting the fifth lens component, and reference symbols $\nu_{VIp}$ and $\nu_{VIn}$ respectively represent Abbe's numbers of the positive and negative lens elements constituting the sixth lens component.

If any of the above-mentioned conditions is not fulfilled, it is difficult to correct spherical aberration of the secondary spectrum, longitudinal chromatic aberration and lateral chromatic aberration in well balanced state.

If $r_{13}$ becomes larger than the upper limit of the condition (7) and/or $|r_{16}|$ becomes smaller than the lower limit of the condition (9), spherical aberration of the secondary spectrum will be overcorrected and longitudinal chromatic aberration will be undercorrected. On the contrary, if $r_{13}$ becomes smaller than the lower limit of the condition (7) and/or $|r_{16}|$ becomes larger than the upper limit of the condition (9), spherical aberration of the secondary spectrum will be undercorrected and longitudinal chromatic aberration will be overcorrected. Consequently, balance of said aberrations becomes unsatisfactory.

DETAILED DESCRIPTION OF THE PREFERRED EMBODIMENTS

Now, preferred embodiments of the microscope objective according to the present invention are shown below.

| Embodiment 1 | | | |
|---|---|---|---|
| $f = 1$, | NA = 0.5, | $\beta = -40X$, | WD = 2.206 |
| $r_1 = -3.4982$ | | | |
| $d_1 = 0.662$ | | $n_1 = 1.7725$ | $\nu_1 = 49.66$ |
| $r_2 = -2.2539$ | | | |
| $d_2 = 0.052$ | | | |
| $r_3 = 10.9273$ | | | |
| $d_3 = 0.706$ | | $n_2 = 1.497$ | $\nu_2 = 81.61$ |
| $r_4 = -3.8062$ | | | |
| $d_4 = 0.392$ | | | |
| $r_5 = 7.4367$ | | | |
| $d_5 = 1.396$ | | $n_3 = 1.43389$ | $\nu_3 = 95.15$ |
| $r_6 = -2.7803$ | | | |
| $d_6 = 0.429$ | | $n_4 = 1.6445$ | $\nu_4 = 40.8$ |
| $r_7 = 2.41$ | | | |
| $d_7 = 1.02$ | | $n_5 = 1.6779$ | $\nu_5 = 55.33$ |
| $r_8 = -6.1119$ | | | |
| $d_8 = 0.392$ | | | |
| $r_9 = 3.4966$ | | | |
| $d_9 = 1.203$ | | $n_6 = 1.497$ | $\nu_6 = 81.61$ |
| $r_{10} = -4.13$ | | | |
| $d_{10} = 0.492$ | | $n_7 = 1.74$ | $\nu_7 = 31.7$ |
| $r_{11} = 9.1009$ | | | |
| $d_{11} = 1.151$ | | | |
| $r_{12} = -3.4885$ | | | |
| $d_{12} = 0.183$ | | $n_8 = 1.71736$ | $\nu_8 = 29.51$ |
| $r_{13} = 1.6744$ | | | |
| $d_{13} = 0.34$ | | $n_9 = 1.497$ | $\nu_9 = 81.61$ |
| $r_{14} = 32.062$ | | | |
| $d_{14} = 0.026$ | | | |
| $r_{15} = 1.8617$ | | | |
| $d_{15} = 0.745$ | | $n_{10} = 1.78472$ | $\nu_{10} = 25.68$ |

-continued

| Embodiment 1 |||
|---|---|---|
| f = 1, NA = 0.5, β = −40X, WD = 2.206 ||||

| $r_{16} = -1.6982$ | | |
|---|---|---|
| $d_{16} = 0.719$ | $n_{11} = 1.726$ | $\nu_{11} = 53.56$ |
| $r_{17} = 1.216$ | | |

$|f_{VVI}| = 2.22$, $r_1/r_2 = 1.55$, $|r_3/r_4| = 2.87$
$|r_{12}/(n_{V-1} - 1)| = 4.86$, $|r_{17}/(1 - n_{VI-2})| = 1.68$ thickness of cover glass = 0.262

| Embodiment 2 |||
|---|---|---|
| f = 1, NA = 0.5, β = −40X, WD = 2.236 ||||

| $r_1 = -3.1627$ | | |
|---|---|---|
| $d_1 = 0.663$ | $n_1 = 1.7725$ | $\nu_1 = 49.66$ |
| $r_2 = -2.244$ | | |
| $d_2 = 0.05$ | | |
| $r_3 = 10.4467$ | | |
| $d_3 = 0.728$ | $n_2 = 1.497$ | $\nu_2 = 81.61$ |
| $r_4 = -4.3406$ | | |
| $d_4 = 0.197$ | | |
| $r_5 = 6.4547$ | | |
| $d_5 = 1.424$ | $n_3 = 1.43389$ | $\nu_3 = 95.15$ |
| $r_6 = -3.0048$ | | |
| $d_6 = 0.454$ | $n_4 = 1.6445$ | $\nu_4 = 40.8$ |
| $r_7 = 2.7084$ | | |
| $d_7 = 1.023$ | $n_5 = 1.6779$ | $\nu_5 = 55.33$ |
| $r_8 = -5.5653$ | | |
| $d_8 = 0.34$ | | |
| $r_9 = 3.6181$ | | |
| $d_9 = 1.247$ | $n_6 = 1.497$ | $\nu_6 = 81.61$ |
| $r_{10} = -4.89$ | | |
| $d_{10} = 0.519$ | $n_7 = 1.74$ | $\nu_7 = 31.7$ |
| $r_{11} = 9.1935$ | | |
| $d_{11} = 1.19$ | | |
| $r_{12} = -2.7454$ | | |
| $d_{12} = 0.21$ | $n_8 = 1.71736$ | $\nu_8 = 29.51$ |
| $r_{13} = 1.286$ | | |
| $d_{13} = 0.277$ | $n_9 = 1.497$ | $\nu_9 = 81.61$ |
| $r_{14} = -168.3923$ | | |
| $d_{14} = 0.026$ | | |
| $r_{15} = 1.7001$ | | |
| $d_{15} = 0.775$ | $n_{10} = 1.78472$ | $\nu_{10} = 25.71$ |
| $r_{16} = -1.5008$ | | |
| $d_{16} = 0.776$ | $n_{11} = 1.726$ | $\nu_{11} = 53.56$ |
| $r_{17} = 1.2095$ | | |

$|f_{VVI}| = 2.03$, $r_1/r_2 = 1.42$, $|r_3/r_4| = 2.41$
$|r_{12}/(n_{V-1} - 1)| = 3.83$, $|r_{17}/(1 - n_{VI-2})| = 1.67$ thickness of cover glass = 0.262

| Embodiment 3 |||
|---|---|---|
| f = 1, NA = 0.5, β = −40X, WD = 2.232 ||||

| $r_1 = -3.4901$ | | |
|---|---|---|
| $d_1 = 0.662$ | $n_1 = 1.7725$ | $\nu_1 = 49.66$ |
| $r_2 = -2.2332$ | | |
| $d_2 = 0.05$ | | |
| $r_3 = 8.8889$ | | |
| $d_3 = 0.727$ | $n_2 = 1.497$ | $\nu_2 = 81.61$ |
| $r_4 = -4.0044$ | | |
| $d_4 = 0.197$ | | |
| $r_5 = 7.9819$ | | |
| $d_5 = 1.422$ | $n_3 = 1.43389$ | $\nu_3 = 95.15$ |
| $r_6 = -2.824$ | | |
| $d_6 = 0.453$ | $n_4 = 1.6445$ | $\nu_4 = 40.8$ |
| $r_7 = 2.3314$ | | |
| $d_7 = 1.022$ | $n_5 = 1.6779$ | $\nu_5 = 55.33$ |
| $r_8 = -6.9004$ | | |
| $d_8 = 0.339$ | | |
| $r_9 = 3.6048$ | | |
| $d_9 = 1.246$ | $n_6 = 1.497$ | $\nu_6 = 81.61$ |
| $r_{10} = -4.2614$ | | |
| $d_{10} = 0.518$ | $n_7 = 1.74$ | $\nu_7 = 31.7$ |
| $r_{11} = 9.972$ | | |
| $d_{11} = 1.189$ | | |
| $r_{12} = -3.3423$ | | |
| $d_{12} = 0.209$ | $n_8 = 1.71736$ | $\nu_8 = 29.51$ |
| $r_{13} = 1.5201$ | | |

-continued

| Embodiment 3 |||
|---|---|---|
| f = 1, NA = 0.5, β = −40X, WD = 2.232 ||||

| $d_{13} = 0.276$ | $n_9 = 1.497$ | $\nu_9 = 81.61$ |
|---|---|---|
| $r_{14} = -222.3991$ | | |
| $d_{14} = 0.026$ | | |
| $r_{15} = 1.8581$ | | |
| $d_{15} = 0.774$ | $n_{10} = 1.78472$ | $\nu_{10} = 25.68$ |
| $r_{16} = -1.6017$ | | |
| $d_{16} = 0.774$ | $n_{11} = 1.726$ | $\nu_{11} = 53.56$ |
| $r_{17} = 1.2426$ | | |

$|f_{VVI}| = 2.29$, $r_1/r_2 = 1.56$, $|r_3/r_4| = 2.22$
$|r_{12}/(n_{V-1} - 1)| = 4.66$, $|r_{17}/(1 - n_{VI-2})| = 1.71$ thickness of cover glass = 0.261

| Embodiment 4 |||
|---|---|---|
| f = 1, NA = 0.5, β = −40X, WD = 2.186 ||||

| $r_1 = -3.5714$ | | |
|---|---|---|
| $d_1 = 0.663$ | $n_1 = 1.7725$ | $\nu_1 = 49.66$ |
| $r_2 = -2.2337$ | | |
| $d_2 = 0.327$ | | |
| $r_3 = 13.0111$ | | |
| $d_3 = 0.678$ | $n_2 = 1.497$ | $\nu_2 = 81.61$ |
| $r_4 = -3.8674$ | | |
| $d_4 = 0.342$ | | |
| $r_5 = 7.47$ | | |
| $d_5 = 1.374$ | $n_3 = 1.43389$ | $\nu_3 = 95.15$ |
| $r_6 = -2.8644$ | | |
| $d_6 = 0.404$ | $n_4 = 1.6445$ | $\nu_4 = 40.8$ |
| $r_7 = 2.4542$ | | |
| $d_7 = 1$ | $n_5 = 1.6779$ | $\nu_5 = 55.33$ |
| $r_8 = -6.105$ | | |
| $d_8 = 0.393$ | | |
| $r_9 = 3.3165$ | | |
| $d_9 = 1.198$ | $n_6 = 1.497$ | $\nu_6 = 81.61$ |
| $r_{10} = -4.4735$ | | |
| $d_{10} = 0.469$ | $n_7 = 1.74$ | $\nu_7 = 31.7$ |
| $r_{11} = 7.302$ | | |
| $d_{11} = 1.13$ | | |
| $r_{12} = -3.4543$ | | |
| $d_{12} = 0.183$ | $n_8 = 1.71636$ | $\nu_8 = 29.51$ |
| $r_{13} = 1.891$ | | |
| $d_{13} = 0.341$ | $n_9 = 1.497$ | $\nu_9 = 81.61$ |
| $r_{14} = 18.8426$ | | |
| $d_{14} = 0.026$ | | |
| $r_{15} = 1.8343$ | | |
| $d_{15} = 0.725$ | $n_{10} = 1.78472$ | $\nu_{10} = 25.68$ |
| $r_{16} = -1.8322$ | | |
| $d_{16} = 0.699$ | $n_{11} = 1.726$ | $\nu_{11} = 53.56$ |
| $r_{17} = 1.1646$ | | |

$|f_{VVI}| = 2.13$, $r_1/r_2 = 1.6$, $|r_3/r_4| = 3.36$
$|r_{12}/(n_{V-1} - 1)| = 4.82$, $|r_{17}/(1 - n_{VI-2})| = 1.6$ thickness of cover glass = 0.262

| Embodiment 5 |||
|---|---|---|
| f = 1, NA = 0.5, β = −40X, WD = 2.208 ||||

| $r_1 = -3.4749$ | | |
|---|---|---|
| $d_1 = 0.662$ | $n_1 = 1.76647$ | $\nu_1 = 37.03$ |
| $r_2 = -2.2884$ | | |
| $d_2 = 0.05$ | | |
| $r_3 = 9.7628$ | | |
| $d_3 = 0.702$ | $n_2 = 1.497$ | $\nu_2 = 81.61$ |
| $r_4 = -3.6774$ | | |
| $d_4 = 0.392$ | | |
| $r_5 = 7.5333$ | | |
| $d_5 = 1.397$ | $n_3 = 1.43389$ | $\nu_3 = 95.15$ |
| $r_6 = -2.6362$ | | |
| $d_6 = 0.428$ | $n_4 = 1.63599$ | $\nu_4 = 36.59$ |
| $r_7 = 2.444$ | | |
| $d_7 = 0.997$ | $n_5 = 1.68188$ | $\nu_5 = 48.89$ |
| $r_8 = -6.0685$ | | |
| $d_8 = 0.392$ | | |
| $r_9 = 3.618$ | | |
| $d_9 = 0.471$ | $n_6 = 1.49791$ | $\nu_6 = 55.84$ |
| $r_9' = 2.5286$ | | |
| $d_9' = 0.968$ | $n_6' = 1.497$ | $\nu_6' = 81.61$ |

-continued

Embodiment 5
f = 1, NA = 0.5, β = −40X, WD = 2.208

| | | |
|---|---|---|
| $r_{10} = -2.9389$ | | |
| $d_{10} = 0.493$ | $n_7 = 1.75001$ | $v_7 = 28.27$ |
| $r_{11} = 9.0927$ | | |
| $d_{11} = 0.936$ | | |
| $r_{12} = -3.4568$ | | |
| $d_{12} = 0.183$ | $n_8 = 1.70991$ | $v_8 = 30.86$ |
| $r_{13} = 1.7111$ | | |
| $d_{13} = 0.34$ | $n_9 = 1.497$ | $v_9 = 81.61$ |
| $r_{14} = 37.4012$ | | |
| $d_{14} = 0.026$ | | |
| $r_{15} = 1.8973$ | | |
| $d_{15} = 0.749$ | $n_{10} = 1.80265$ | $v_{10} = 25.11$ |
| $r_{16} = -1.6842$ | | |
| $d_{16} = 0.724$ | $n_{11} = 1.71559$ | $v_{11} = 55.05$ |
| $r_{17} = 1.1841$ | | |

$|f_{VVI}| = 2.39$, $r_1/r_2 = 1.52$, $|r_3/r_4| = 2.65$
$|r_{12}/(n_{V-1} - 1)| = 4.87$, $|r_{17}/(1 - n_{VI-2})| = 1.65$ thickness of cover glass = 0.262

In embodiments shown in the above, reference symbols $r_1$ through $r_{17}$ respectively represent radii of curvature of respective lens surfaces, reference symbols $d_1$ through $d_{16}$ respectively represent thicknesses of respective lenses and airspaces between respective lenses, reference symbols $n_1$ though $n_{11}$ respectively represent refractive indices of respective lenses, and reference symbols $v_1$ through $v_{11}$ respectively represent Abbe's numbers of respective lenses.

Figure 1:
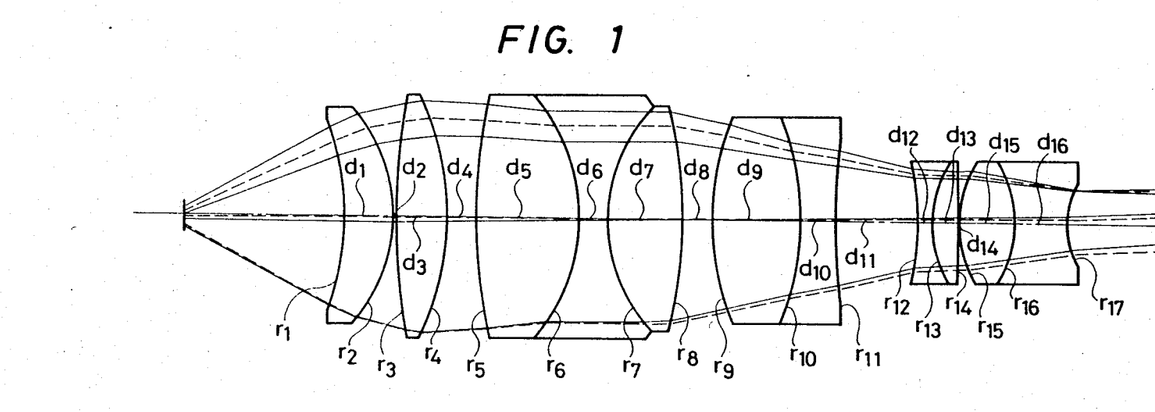
FIG. 1 shows a sectional view of Embodiments 1 through 4 of the microscope objective according to the present invention.
Figure 3:
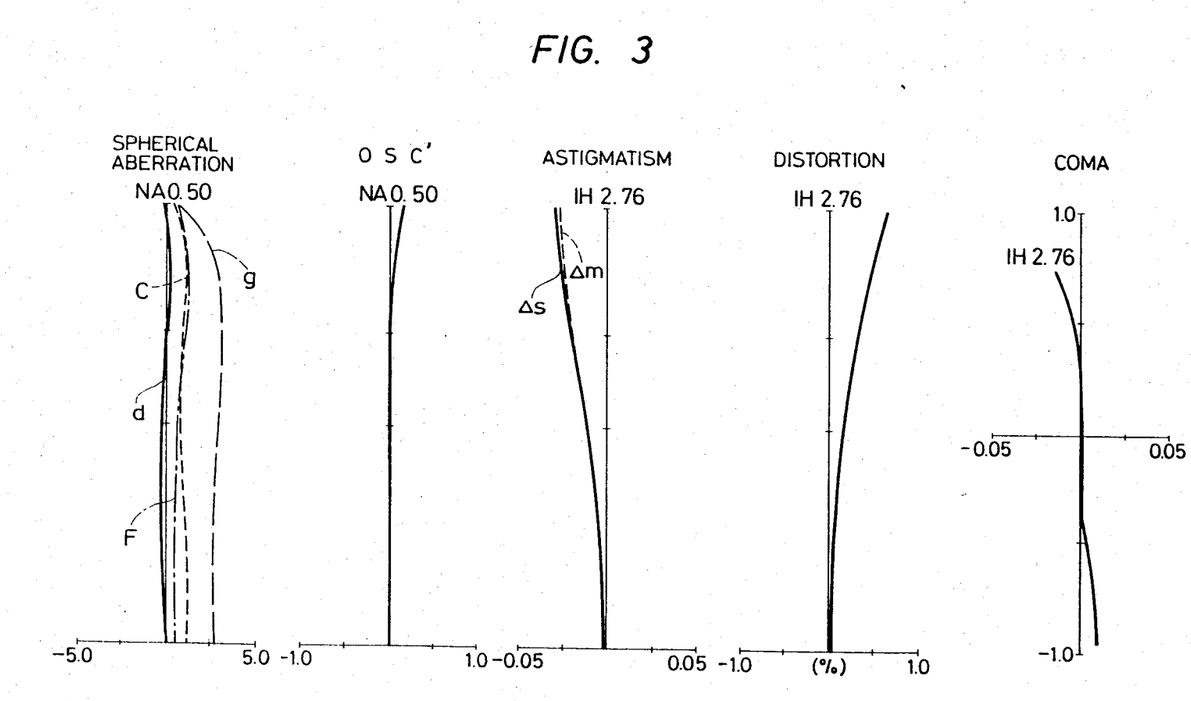
FIGS. 3 through 7 respectively show graphs illustrating aberration curves of Embodiments 1 through 5 of the present invention.
Figure 4:
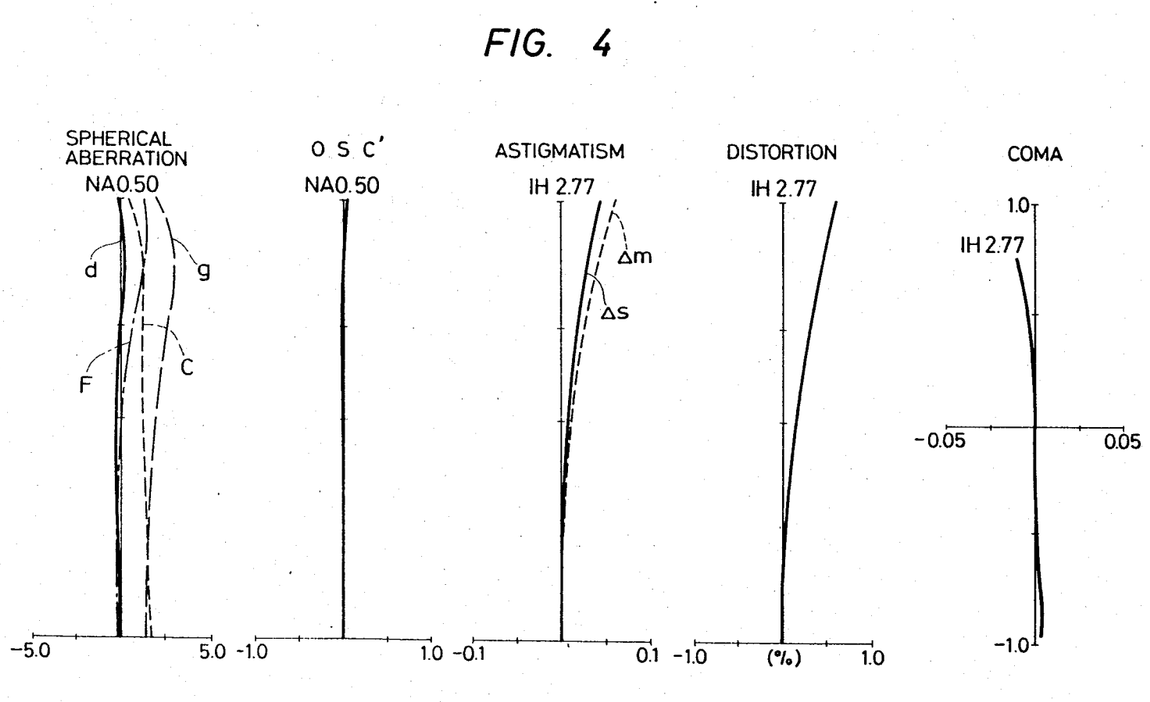
Figure 5:
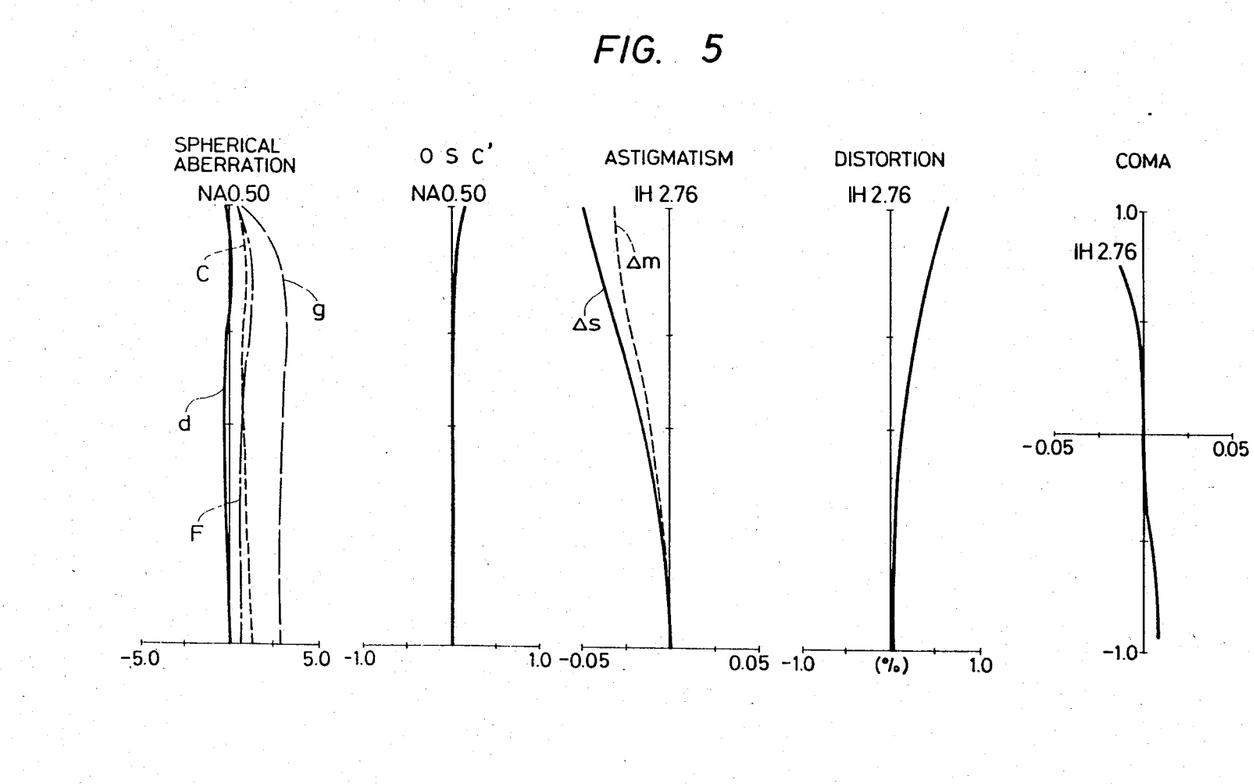
Figure 6:
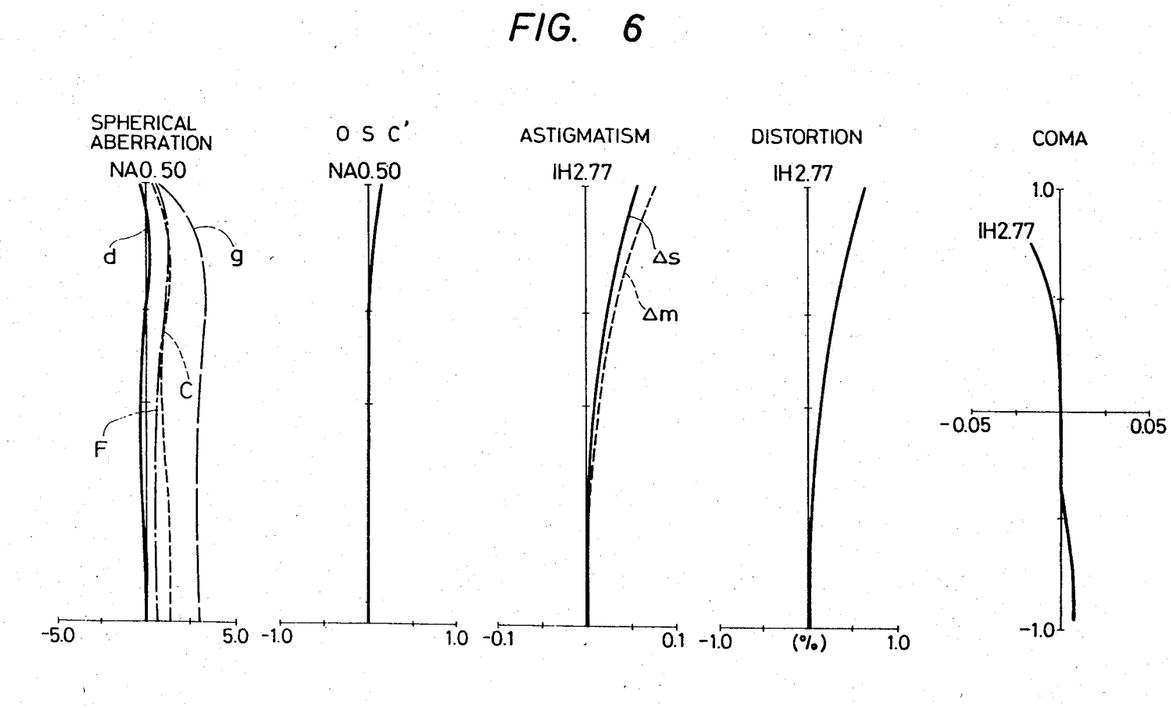
Figure 7:
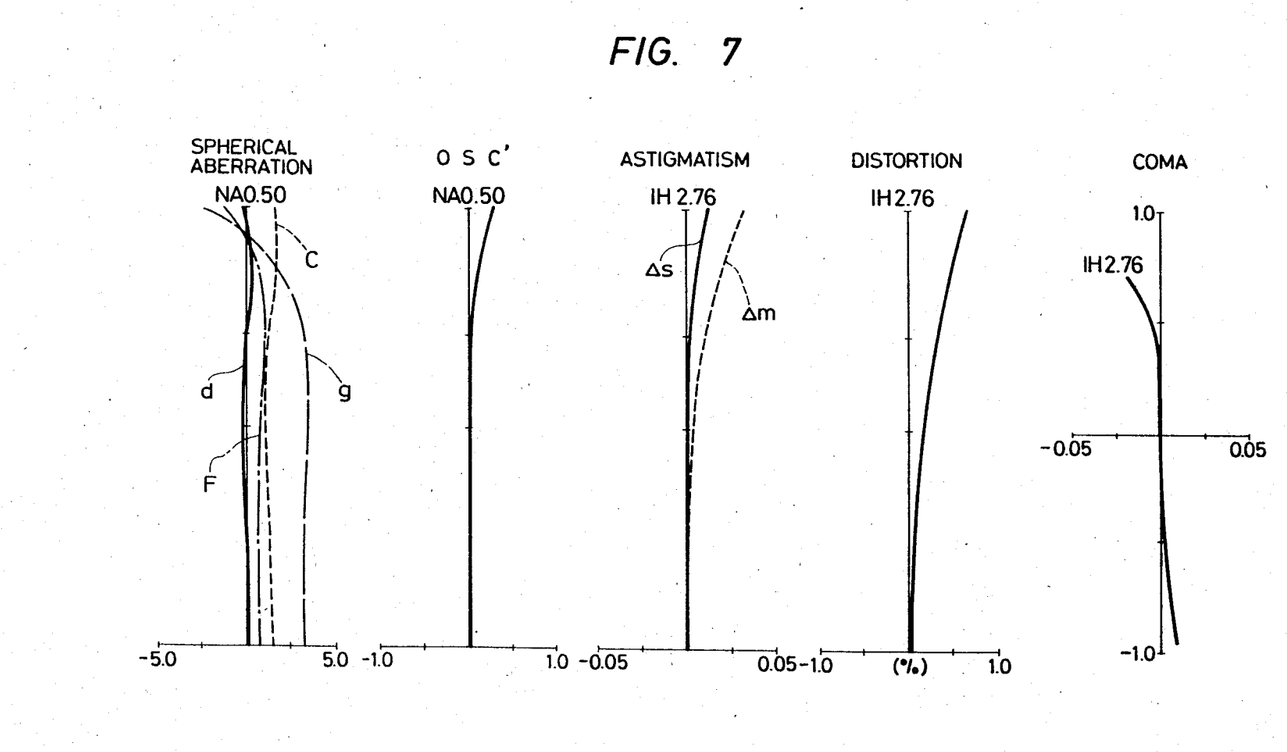

Out of respective embodiments shown in the above, Embodiment 1 has the lens configuration as shown in FIG. 1 and its aberration curves are as shown in FIG. 3.

The microscope objective according to Embodiment 1 is arranged that it is possible to correct aggravation of aberrations, which occurs when different thicknesses of cover glasses are used, by adjusting the airspace $d_8$ between the third and fourth lens components.

Figure 8:
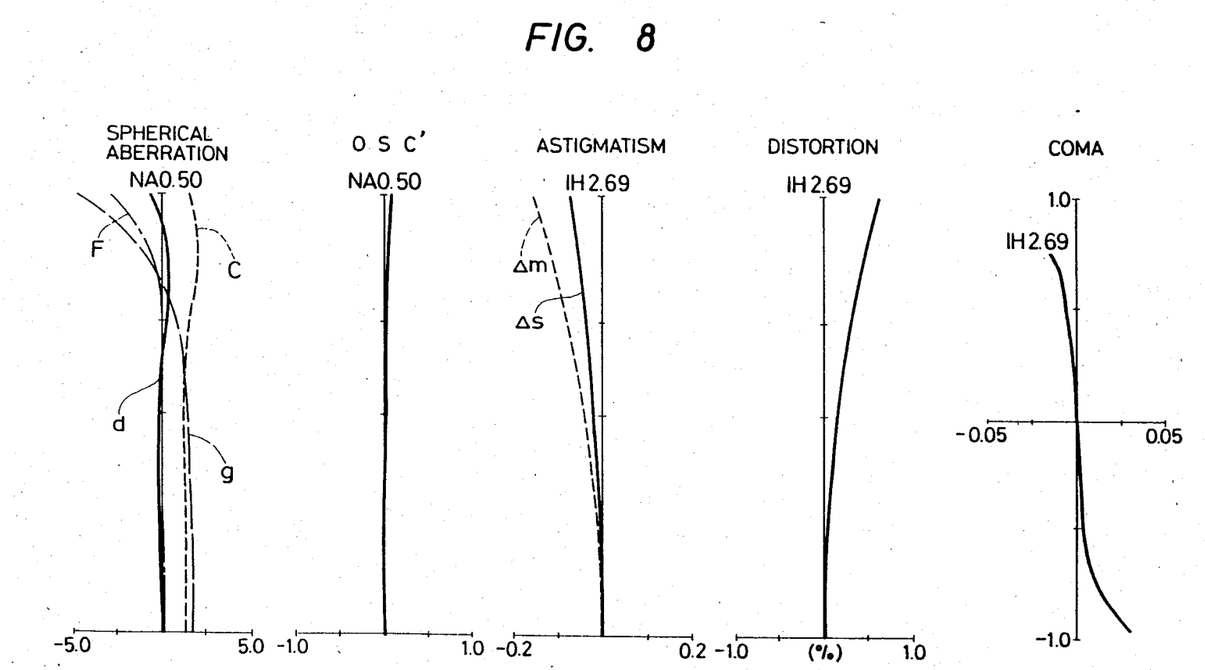
FIGS. 8 and 9 respectively show graphs illustrating aberration curves of Embodiment 1 when different thicknesses of cover glasses are used.
Figure 9:
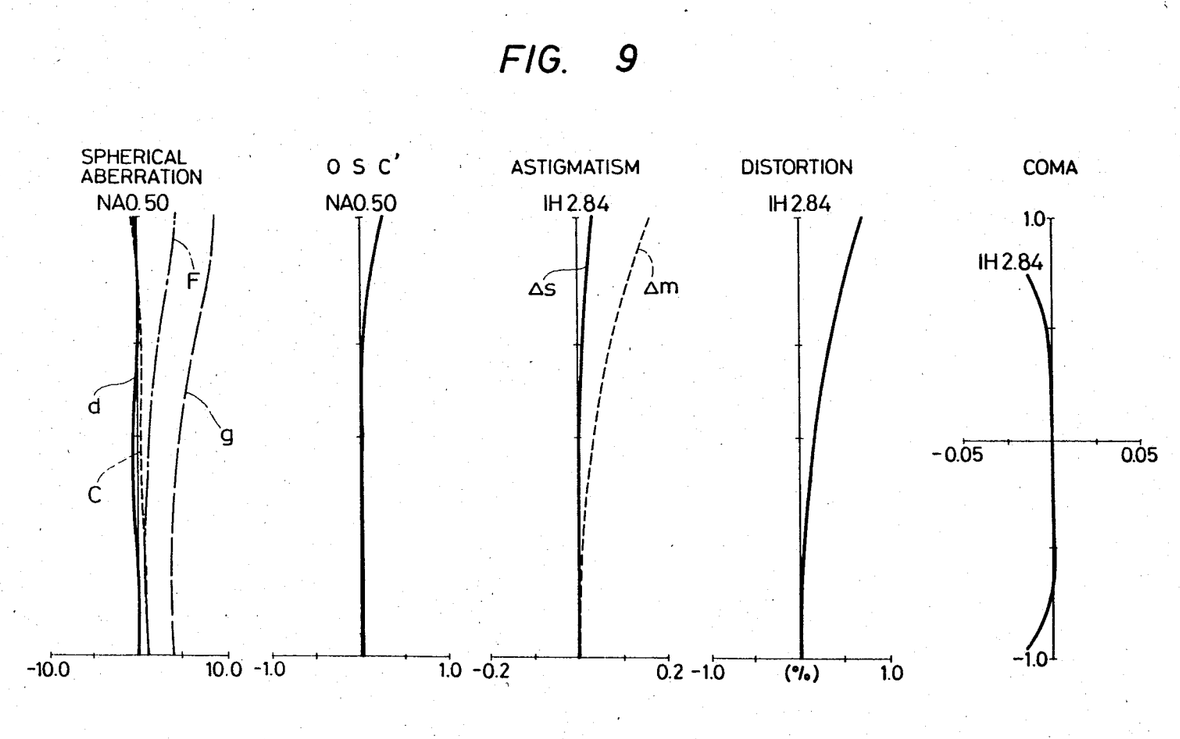

For example, by adjusting said airspace as $d_8 = 0.157$ when the thickness of cover glass is 0 mm (when a cover glass is not used) and as $d_8 = 0.664$ when the thickness of cover glass is 2 mm, it is possible to maintain the favourable states of aberrations as shown in FIGS. 8 and 9 respectively.

The lens systems according to Embodiments 2, 3 and 4 also have the lens configuration as shown in FIG. 1. Out of them, Embodiments 2 and 3 are arranged that it is possible to correct aggravation of aberrations, which occurs due to variation in the thickness of cover glass, by adjusting the airspace between the third and fourth lens components. Embodiment 4 is arranged that it is possible to correct aggravation of aberrations, which occurs due to variation in the thickness of cover glass, by adjusting the airspace $d_2$ between the first and second lens components and the airspace $d_8$ between the third and fourth lens components or by adjusting only the airspace $d_8$ between the third and fourth lens components.

Figure 2:
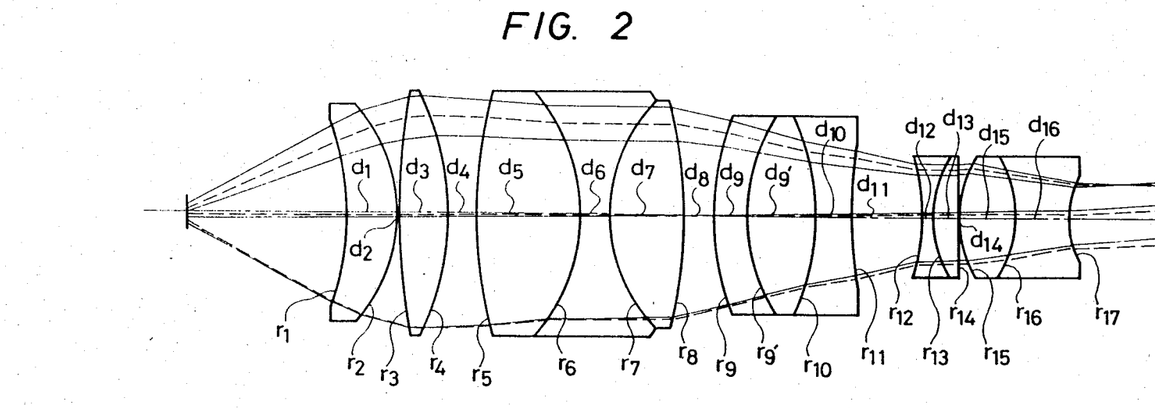
FIG. 2 shows a sectional view of Embodiment 5 of the microscope objective according to the present invention.

The lens system according to Embodiment 5 has the lens configuration as shown in FIG. 2. That is, the fourth lens component is arranged as a cemented lens component formed by cementing three lens elements together. The lens system according to Embodiment 5 is also arranged that it is possible to correct aggravation of aberrations, which occurs due to variation in the thickness of cover glass, by adjusting the airspace $d_8$ between the third and fourth lens components.

Aberrations curves of said Embodiments 2 through 5 are as shown in FIGS. 4 through 7 respectively.

As described so far and as it will be evident from respective embodiments, the microscope objective according to the present invention is arranged that the working distance is extremely long, aberrations are favourably corrected up to the marginal portion of field, and quality of image is excellent. The working distances WD of respective embodiments are WD=2.206 for Embodiment 1, WD=2.236 for Embodiment 2, WD=2.232 for Embodiment 3, WD=2.186 for Embodiment 4, and WD=2.208 for Embodiment 5 and are remarkably longer than those of known microscope objectives with magnifications about 40× which are considered to have long working distances. For example, the microscope objective disclosed in Japanese published unexamined patent application No. 33646/72 has the working distance about 0.71. Compared with said known microscope objective, the working distance of the microscope objective according to the present invention is extremely long. Besides, aberrations of the microscope objective according to the present inveniton are corrected extremely favourably as it will be evident from FIGS. 3 through 7.

I claim:

1. A microscope objective comprising a first lens component arranged as a positive meniscus lens having a concave surface on the object side, a second lens component arranged as a positive lens, a third lens component comprising a positive lens element and having positive refractive power as a whole, a fourth lens component comprising a positive lens element and having positive refractive power as a whole, a fifth lens component comprising a negative lens element and having negative refractive power as a whole, and a sixth lens component arranged as a cemented positive meniscus lens, said microscope objective being arranged to fulfill the conditions (1) through (6) shown below:

$$1.8f < |f_{VVI}| < 2.6f, f_{VVI} < 0 \quad (1)$$

$$1.2 < r_1/r_2 < 1.8 \quad (2)$$

$$2 < |r_3/r_4| < 3.7, r_3/r_4 < 0 \quad (3)$$

$$v_{IIp}, v_{IIIp-1} > 65 \quad (4)$$

$$3.5f < |r_{12}/(n_{V-1} - 1)| < 5.2f \quad (5)$$
$$r_{12}/(n_{V-1} - 1) < 0$$

$$1.5f < |r_{17}/(1 - n_{VI-2})| < 2f \quad (6)$$
$$r_{17}/(1 - n_{VI-2}) < 0$$

where, reference symbol f represents the focal length of the lens system as a whole, reference symbol $f_{VVI}$ represents the total focal length of the fifth and sixth lens components, reference symbols $r_1$ and $r_2$ respectively represent radii of curvature of the surface on the object side and surface on the image side of the first lens component, reference symbols $r_3$ and $r_4$ respectively represent radii of curvature of the surface on the object side and surface on the image side of the second lens component, reference symbol $v_{IIp}$ represents Abbe's number of the positive lens constituting the second lens component, and reference symbol $v_{IIIp-1}$ represents Abbe's number of the first positive lens element counted from the object side in the third lens component, reference symbol $r_{12}$ represents the radius of curvature of the surface on the object side of the fifth lens component, reference symbol $n_{V-1}$ represents the refractive index of the first negative lens element counted from the object side in the fifth lens component, reference symbol $r_{17}$ represents the side of the sixth lens component, and reference symbol $n_{VI-2}$ represents the refractive index of the second negative lens element counted from the object side in the sixth lens component.

2. A microscope objective according to claim 1 further fulfilling the conditions (7) through (10) shown below:

$$f < r_{13} < 2f \quad (7)$$

$$\nu_{Vp} - \nu_{Vn} > 40 \quad (8)$$

$$f < |r_{16}| < 2f, \; r_{16} < 0 \quad (9)$$

$$\nu_{VIn} - \nu_{VIp} > 20 \quad (10)$$

where, reference symbol $r_{13}$ represents the radius of curvature of the cemented surface on the fifth lens component, reference symbol $r_{16}$ represents the radius of curvature of the cemented surface of the sixth lens component, reference symbols $\nu_{Vp}$ and $\nu_{Vn}$ respectively represent Abbe's numbers of the positive and negative lens elements constituting the fifth lens component, and reference symbols $\nu_{VIp}$ and $\nu_{VIn}$ respectively represents Abbe's numbers of the positive and negative lens elements constituting the sixth lens component.

3. A microscope objective according to claim 2 wherein said third lens component is arranged as a cemented lens component consisting of three lens elements which are a positive, negative and positive lens elements cemented together, said fourth lens component is arranged as a positive cemented doublet consisting of a positive and negative lens elements, and said fifth lens component is arranged as a negative cemented doublet consisting of a negative and positive lens elements, and wherein said microscope objective has the following numerical data:

| $f = 1$, | NA = 0.5, | $\beta = -40X$, | WD = 2.206 |
|---|---|---|---|
| $r_1 = -3.4982$ | | | |
| $d_1 = 0.662$ | $n_1 = 1.7725$ | $\nu_1 = 49.66$ | |
| $r_2 = -2.2539$ | | | |
| $d_2 = 0.052$ | | | |
| $r_3 = 10.9273$ | | | |
| $d_3 = 0.706$ | $n_2 = 1.497$ | $\nu_2 = 81.61$ | |
| $r_4 = -3.8062$ | | | |
| $d_4 = 0.392$ | | | |
| $r_5 = 7.4367$ | | | |
| $d_5 = 1.396$ | $n_3 = 1.43389$ | $\nu_3 = 95.15$ | |
| $r_6 = -2.7803$ | | | |
| $d_6 = 0.429$ | $n_4 = 1.6445$ | $\nu_4 = 40.8$ | |
| $r_7 = 2.41$ | | | |
| $d_7 = 1.02$ | $n_5 = 1.6779$ | $\nu_5 = 55.53$ | |
| $r_8 = -6.1119$ | | | |
| $d_8 = 0.392$ | | | |
| $r_9 = 3.4966$ | | | |
| $d_9 = 1.203$ | $n_6 = 1.497$ | $\nu_6 = 81.61$ | |
| $r_{10} = -4.13$ | | | |
| $d_{10} = 0.492$ | $n_7 = 1.74$ | $\nu_7 = 31.7$ | |
| $r_{11} = 9.1009$ | | | |
| $d_{11} = 1.151$ | | | |
| $r_{12} = -3.4885$ | | | |
| $d_{12} = 0.183$ | $n_8 = 1.71736$ | $\nu_8 = 29.51$ | |
| $r_{13} = 1.6744$ | | | |
| $d_{13} = 0.34$ | $n_9 = 1.497$ | $\nu_9 = 81.61$ | |
| $r_{14} = 32.062$ | | | |
| $d_{14} = 0.026$ | | | |
| $r_{15} = 1.8617$ | | | |
| $d_{15} = 0.475$ | $n_{10} = 1.78472$ | $\nu_{10} = 25.68$ | |
| $r_{16} = -1.6982$ | | | |
| $d_{16} = 0.719$ | $n_{11} = 1.726$ | $\nu_{11} = 53.56$ | |
| $r_{17} = 1.216$ | | | |
| $|f_{VVI}| = 2.22$, $r_1/r_2 = 1.55$, $|r_3/r_4| = 2.87$ | | | |

| $f = 1$, | NA = 0.5, | $\beta = -40X$, | WD = 2.206 |
|---|---|---|---|
| $|r_{12}/(n_{V-1} - 1)| = 4.86$, $|r_{17}/(1 - n_{VI-2})| = 1.68$ | | | | where, reference symbols $r_1$ through $r_{17}$ respectively represent radii of curvature of respective lens surfaces, reference symbols $d_1$ through $d_{16}$ respectively represent thicknesses of respective lenses and airspaces between respective lenses, reference symbols $n_1$ through $n_{11}$ respectively represent refractive indices of respective lenses, and reference symbols $\nu_1$ through $\nu_{11}$ respectively represent Abbe's numbers of respective lenses.

4. A microscope objective according to claim 2 wherein said third lens component is arranged as a cemented lens component consisting of three lens elements which are a positive, negative and positive lens elements cemented together, said fourth lens component is arranged as a positive cemented doublet consisting of a positive and negative lens elements, and said fifth lens component is arranged as a negative cemented doublet consisting of a negative and positive lens elements, and wherein said microscope objective has the following numerical data:

| $f = 1$, | NA = 0.5, | $\beta = -40X$, | WD = 2.236 |
|---|---|---|---|
| $r_1 = -3.1627$ | | | |
| $d_1 = 0.663$ | $n_1 = 1.7725$ | $\nu_1 = 49.66$ | |
| $r_2 = -2.244$ | | | |
| $d_2 = 0.05$ | | | |
| $r_3 = 10.4467$ | | | |
| $d_3 = 0.728$ | $n_2 = 1.497$ | $\nu_2 = 81.61$ | |
| $r_4 = -4.3406$ | | | |
| $d_4 = 0.197$ | | | |
| $r_5 = 6.4547$ | | | |
| $d_5 = 1.424$ | $n_3 = 1.43389$ | $\nu_3 = 95.15$ | |
| $r_6 = -3.0048$ | | | |
| $d_6 = 0.454$ | $n_4 = 1.6445$ | $\nu_4 = 40.8$ | |
| $r_7 = 2.7084$ | | | |
| $d_7 = 1.023$ | $n_5 = 1.6779$ | $\nu_5 = 55.33$ | |
| $r_8 = -5.5653$ | | | |
| $d_8 = 0.34$ | | | |
| $r_9 = 3.6181$ | | | |
| $d_9 = 1.247$ | $n_6 = 1.497$ | $\nu_6 = 81.61$ | |
| $r_{10} = -4.89$ | | | |
| $d_{10} = 0.519$ | $n_7 = 1.74$ | $\nu_7 = 31.7$ | |
| $r_{11} = 9.1935$ | | | |
| $d_{11} = 1.19$ | | | |
| $r_{12} = -2.7454$ | | | |
| $d_{12} = 0.21$ | $n_8 = 1.71736$ | $\nu_8 = 29.51$ | |
| $r_{13} = 1.286$ | | | |
| $d_{13} = 0.277$ | $n_9 = 1.497$ | $\nu_9 = 81.61$ | |
| $r_{14} = -168.3923$ | | | |
| $d_{14} = 0.026$ | | | |
| $r_{15} = 1.7001$ | | | |
| $d_{15} = 0.775$ | $n_{10} = 1.78472$ | $\nu_{10} = 25.71$ | |
| $r_{16} = -1.5008$ | | | |
| $d_{16} = 0.776$ | $n_{11} = 1.726$ | $\nu_{11} = 53.56$ | |
| $r_{17} = 1.2095$ | | | |
| $|f_{VVI}| = 2.03$, $r_1/r_2 = 1.42$, $|r_3/r_4| = 2.41$ | | | |
| $|r_{12}/(n_{V-1} - 1)| = 3.83$, $|r_{17}/(1 - n_{VI-2})| = 1.67$ | | | | where, reference symbols $r_1$ through $r_{17}$ respectively represent radii of curvature of respective lens surfaces, reference symbols $d_1$ through $d_{16}$ respectively represent thicknesses of respective lenses and airspaces between respective lesnes, reference symbols $n_1$ through $n_{11}$ respectively represent refractive indices of respective lenses, and reference symbols $\nu_1$ through $\nu_{11}$ respectively represent Abbe's numbers of respective lenses.

5. A microscope objective according to claim 2 wherein said third lens component is arranged as a cemented lens component consisting of three lens elements which are a positive, negative and positive lens elements cemented together, said fourth lens component is arranged as a positive cemented doublet consisting of a positive and negative lens elements, and said fifth lens component is arranged as a negative cemented doublet consisting of a negative and positive lens elements, and wherein said microscope objective has the following numerical data:

| $f = 1$, | $NA = 0.5$, | $\beta = -40X$, | $WD = 2.232$ |
|---|---|---|---|
| $r_1 = -3.4901$ | | | |
| $d_1 = 0.662$ | $n_1 = 1.7725$ | $\nu_1 = 49.66$ | |
| $r_2 = -2.2332$ | | | |
| $d_2 = 0.05$ | | | |
| $r_3 = 8.8889$ | | | |
| $d_3 = 0.727$ | $n_2 = 1.497$ | $\nu_2 = 81.61$ | |
| $r_4 = -4.0044$ | | | |
| $d_4 = 0.197$ | | | |
| $r_5 = 7.9819$ | | | |
| $d_5 = 1.422$ | $n_3 = 1.43389$ | $\nu_3 = 95.15$ | |
| $r_6 = -2.824$ | | | |
| $d_6 = 0.453$ | $n_4 = 1.6445$ | $\nu_4 = 40.8$ | |
| $r_7 = 2.3314$ | | | |
| $d_7 = 1.022$ | $n_5 = 1.6779$ | $\nu_5 = 55.33$ | |
| $r_8 = -6.9004$ | | | |
| $d_8 = 0.339$ | | | |
| $r_9 = 3.6048$ | | | |
| $d_9 = 1.246$ | $n_6 = 1.497$ | $\nu_6 = 81.61$ | |
| $r_{10} = -4.2614$ | | | |
| $d_{10} = 0.518$ | $n_7 = 1.74$ | $\nu_7 = 31.7$ | |
| $r_{11} = 9.972$ | | | |
| $d_{11} = 1.189$ | | | |
| $r_{12} = -3.3423$ | | | |
| $d_{12} = 0.209$ | $n_8 = 1.71736$ | $\nu_8 = 29.51$ | |
| $r_{13} = 1.5201$ | | | |
| $d_{13} = 0.276$ | $n_9 = 1.497$ | $\nu_9 = 81.61$ | |
| $r_{14} = -222.3991$ | | | |
| $d_{14} = 0.026$ | | | |
| $r_{15} = 1.8581$ | | | |
| $d_{15} = 0.774$ | $n_{10} = 1.78472$ | $\nu_{10} = 25.68$ | |
| $r_{16} = -1.6017$ | | | |
| $d_{16} = 0.774$ | $n_{11} = 1.726$ | $\nu_{11} = 53.56$ | |
| $r_{17} = 1.2426$ | | | |
| $\|f_{VVI}\| = 2.29$, $r_1/r_2 = 1.56$, $\|r_3/r_4\| = 2.22$ | | | |
| $\|r_{12}/(n_{V-1} - 1)\| = 4.66$, $\|r_{17}/(1 - n_{VI-2})\| = 1.71$ | | | | where, reference symbols $r_1$ through $r_{17}$ respectively represent radii of curvature of respective lens surfaces, reference symbols $d_1$ through $d_{16}$ respectively represent thicknesses of respective lenses and airspaces between respective lenses, reference symbols $n_1$ through $n_{11}$ respectively represent refractive indices of respective lenses, and reference symbols $\nu_1$ through $\nu_{11}$ respectively represent Abbe's numbers of respective lenses.

6. A microscope objective according to claim 2 wherein said third lens component is arranged as a cemented lens component consisting of three lens elements which are a positive, negative and positive lens elements cemented together, said fourth lens component is arranged as a positive cemented doublet consisting of a positive and negative lens elements, and said fifth lens component is arranged as a negative cemented doublet consisting of a negative and positive lens elements, and wherein said microscope objective has the following numerical data:

| $f = 1$, | $NA = 0.5$, | $\beta = -40X$, | $WD = 2.186$ |
|---|---|---|---|
| $r_1 = -3.5714$ | | | |
| $d_1 = 0.663$ | $n_1 = 1.7725$ | $\nu_1 = 49.66$ | |
| $r_2 = -2.2337$ | | | |
| $d_2 = 0.327$ | | | |
| $r_3 = 13.0111$ | | | |
| $d_3 = 0.678$ | $n_2 = 1.497$ | $\nu_2 = 81.61$ | |

-continued

| $f = 1$, | $NA = 0.5$, | $\beta = -40X$, | $WD = 2.186$ |
|---|---|---|---|
| $r_4 = -3.8674$ | | | |
| $d_4 = 0.342$ | | | |
| $r_5 = 7.47$ | | | |
| $d_5 = 1.374$ | $n_3 = 1.43389$ | $\nu_3 = 95.15$ | |
| $r_6 = -2.8644$ | | | |
| $d_6 = 0.404$ | $n_4 = 1.6445$ | $\nu_4 = 40.8$ | |
| $r_7 = 2.4542$ | | | |
| $d_7 = 1$ | $n_5 = 1.6779$ | $\nu_5 = 55.33$ | |
| $r_8 = -6.105$ | | | |
| $d_8 = 0.393$ | | | |
| $r_9 = 3.3165$ | | | |
| $d_9 = 1.198$ | $n_6 = 1.497$ | $\nu_6 = 81.61$ | |
| $r_{10} = -4.4735$ | | | |
| $d_{10} = 0.469$ | $n_7 = 1.74$ | $\nu_7 = 31.7$ | |
| $r_{11} = 7.302$ | | | |
| $d_{11} = 1.13$ | | | |
| $r_{12} = -3.4543$ | | | |
| $d_{12} = 0.183$ | $n_8 = 1.71736$ | $\nu_8 = 29.51$ | |
| $r_{13} = 1.891$ | | | |
| $d_{13} = 0.341$ | $n_9 = 1.497$ | $\nu_9 = 81.61$ | |
| $r_{14} = 18.8426$ | | | |
| $d_{14} = 0.026$ | | | |
| $r_{15} = 1.8343$ | | | |
| $d_{15} = 0.725$ | $n_{10} = 1.78472$ | $\nu_{10} = 25.68$ | |
| $r_{16} = -1.8322$ | | | |
| $d_{16} = 0.699$ | $n_{11} = 1.726$ | $\nu_{11} = 53.56$ | |
| $r_{17} = 1.1646$ | | | |
| $\|f_{VVI}\| = 2.13$, $r_1/r_2 = 1.6$, $\|r_3/r_4\| = 3.36$ | | | |
| $\|r_{12}/(n_{V-1} - 1)\| = 4.82$, $\|r_{17}/(1 - n_{VI-2})\| = 1.6$ | | | | where, reference symbols $r_1$ through $r_{17}$ respectively represent radii of curvature of respective lens surfaces, reference symbols $d_1$ through $d_{16}$ respectively represent thicknesses of respective lenses and airspaces between respective lenses, reference symbols $n_1$ through $n_{11}$ respectively represent refractive indices of respective lenses, and reference symbols $\nu_1$ through $\nu_{11}$ respectively represent Abbe's numbers of respective lenses.

7. A microscope objective according to claim 2 wherein said third lens component is arranged as a cemented lens component consisting of three lens elements which are a positive, negative and positive lens elements cemented together, said fourth lens component is arranged as a cemented lens component consisting of three lens elements which are a negative, positive and negative lens elements cemented together, and said fifth lens component is arranged as a negative cemented doublet consisting of a negative and positive lens elements, and wherein said microscope objective has the following numerical data:

| $f = 1$, | $NA = 0.5$, | $\beta = -40X$, | $WD = 2.208$ |
|---|---|---|---|
| $r_1 = -3.4749$ | | | |
| $d_1 = 0.662$ | $n_1 = 1.76647$ | $\nu_1 = 37.03$ | |
| $r_2 = -2.2884$ | | | |
| $d_2 = 0.05$ | | | |
| $r_3 = 9.7628$ | | | |
| $d_3 = 0.702$ | $n_2 = 1.497$ | $\nu_2 = 81.61$ | |
| $r_4 = -3.6774$ | | | |
| $d_4 = 0.392$ | | | |
| $r_5 = 7.5333$ | | | |
| $d_5 = 1.397$ | $n_3 = 1.43389$ | $\nu_3 = 95.15$ | |
| $r_6 = -2.6362$ | | | |
| $d_6 = 0.428$ | $n_4 = 1.63599$ | $\nu_4 = 36.59$ | |
| $r_7 = 2.444$ | | | |
| $d_7 = 0.997$ | $n_5 = 1.68188$ | $\nu_5 = 48.89$ | |
| $r_8 = -6.0685$ | | | |
| $d_8 = 0.392$ | | | |
| $r_9 = 3.618$ | | | |
| $d_9 = 0.471$ | $n_6 = 1.49791$ | $\nu_6 = 55.84$ | |
| $r_9' = 2.5286$ | | | |
| $d_9' = 0.968$ | $n_6' = 1.497$ | $\nu_6' = 81.61$ | |
| $r_{10} = -2.9389$ | | | |

-continued

| $f = 1,$ | $NA = 0.5,$ | $\beta = -40X,$ | $WD = 2.208$ |
|---|---|---|---|
| $d_{10} = 0.493$ | $n_7 = 1.75001$ | $\nu_7 = 28.27$ | |
| $r_{11} = 9.0927$ | | | |
| $d_{11} = 0.936$ | | | |
| $r_{12} = -3.4568$ | | | |
| $d_{12} = 0.183$ | $n_8 = 1.70991$ | $\nu_8 = 30.86$ | |
| $r_{13} = 1.7111$ | | | |
| $d_{13} = 0.34$ | $n_9 = 1.497$ | $\nu_9 = 81.61$ | |
| $r_{14} = 37.4012$ | | | |
| $d_{14} = 0.026$ | | | |
| $r_{15} = 1.8973$ | | | |
| $d_{15} = 0.749$ | $n_{10} = 1.80265$ | $\nu_{10} = 25.11$ | |
| $r_{16} = -1.6842$ | | | |
| $d_{16} = 0.724$ | $n_{11} = 1.71559$ | $\nu_{11} = 55.05$ | |
| $r_{17} = 1.1841$ | | | |

$|f_{VVI}| = 2.39,\ r_1/r_2 = 1.52,\ |r_3/r_4| = 2.65$

-continued

| $f = 1,$ | $NA = 0.5,$ | $\beta = -40X,$ | $WD = 2.208$ |
|---|---|---|---|
| $|r_{12}/(n_{V-1} - 1)| = 4.87,\ |r_{17}/(1 - n_{VI-2})| = 1.65$ | | | | where, reference symbols $r_1$ through $r_{17}$ respectively represent radii of curvature of respective lens surfaces, reference symbols $d_1$ through $d_{16}$ respectively represent thicknesses of respective lenses and airspaces between respective lenses, reference symbols $n_1$ through $n_{11}$ respectively represent refractive indices of respective lenses, and reference symbols $\nu_1$ through $\nu_{11}$ respectively represent Abbe's numbers of respective lenses.

8. A microscope objective according to claim 1 arranged to vary the airspace between said third lens component and said fourth lens component according to the thickness of cover glass to be used in order to thereby correct aggravation of aberrations to be caused by variation in the thickness of cover glass.

* * * * *